June 23, 1953   E. O. ROGGENSTEIN   2,642,976
MOTOR-DRIVEN CARRIAGE RETURN MECHANISM
FOR BUSINESS MACHINES AND THE LIKE
Filed Sept. 21, 1950
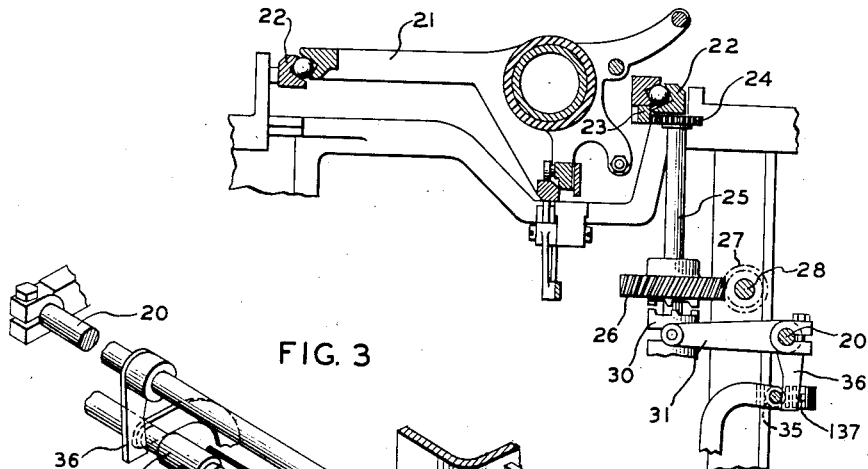
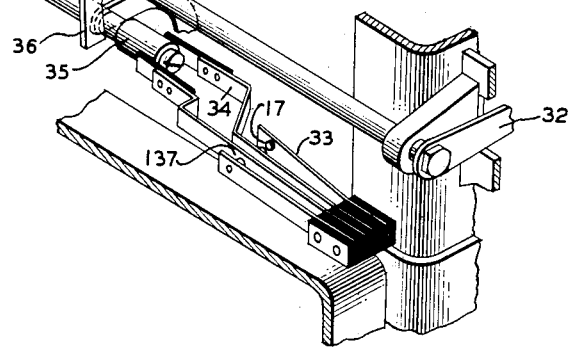
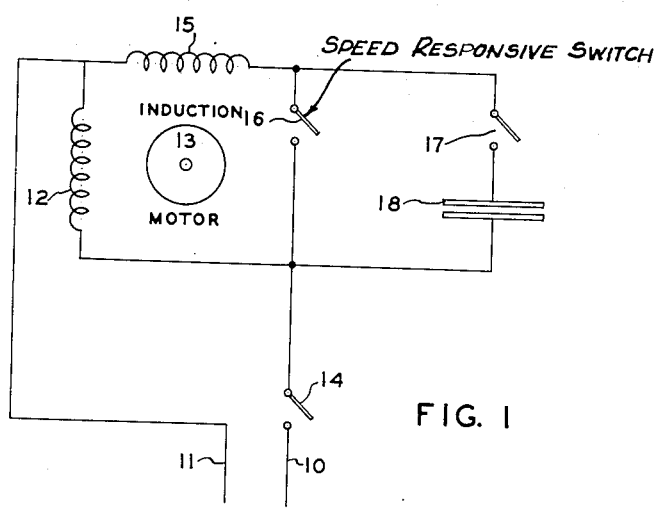
*INVENTOR.*
E. O. ROGGENSTEIN
BY
ATTORNEY Patented June 23, 1953

2,642,976

UNITED STATES PATENT OFFICE 2,642,976

MOTOR-DRIVEN CARRIAGE RETURN MECHANISM FOR BUSINESS MACHINES AND THE LIKE

Edwin O. Roggenstein, Norwalk, Conn., assignor to Remington Rand Inc., New York, N. Y., a corporation of Delaware Application September 21, 1950, Serial No. 185,935

3 Claims. (Cl. 197—66)

This invention relates to circuits for increasing the power developed by induction motors under increased load, as when such motors are used to return heavy carriages in bookkeepers or electric typewriters.

In business machines, such as electrically powered bookkeepers with heavy carriages, it is found that while a small motor develops sufficient power to operate the key levers and actuators for the totalizers it does not have sufficient power to return the heavy carriage. This necessitated the use of larger motors. The use of a supplementary starting winding with induction motors of the type used with business machines has long been known. Automatic centrifugal switches have even been provided to automatically cut out the starting winding when the motor comes up to operating speed. The present invention utilizes the additional torque produced by the starting winding to permit a small motor to overcome occasional increases in load as during carriage return operations in bookkeepers. This is done by placing a normally open auxiliary switch connected in series with an impedance across the motor starting switch to bring the starting winding into the circuit when an operation involving a temporary overload is initiated. The result is that additional power is obtained from a small induction motor when needed.

The principal object of the present invention is to energize the starting winding of an induction motor during operation when the load is suddenly increased to permit the occasional overloading of an induction motor.

A more specific object is to insert a switch and impedance in series with the starting winding of an induction motor, and to provide means for closing the switch when the load is suddenly increased.

A still further object is to insert in a business machine having a power operated carriage return a switch and impedance in series with the starting winding of an induction motor in parallel with the centrifugally operated normally closed starting switch, said added switch being operated when the carriage return is actuated.

A clearer conception of the operation, construction, and further objects of the invention will be had from the following specification when read in conjunction with the accompanying drawings, in which Fig. 1 is a schematic diagram of the circuit of the invention;

Fig. 2 is a general front-to-rear vertical view in section of an electrically powered bookkeeper having a power operated carriage return and having the invention embodied therein, the view being on an irregular section with some parts broken away or shown fragmentarily;

Fig. 3 is an isometric view of certain contacts and means for controlling them.

Referring to the drawing in detail, 10 and 11 indicate power lines connected to the main winding 12 of the induction motor 13 through a switch 14. The additional starting winding 15 is connected in series with a motor starting speed responsive switch 16, which may be manually or centrifugally operated so that it is closed when the motor is at rest and opens when operating speed is reached, and both are connected across the main winding 12. In addition, an auxiliary switch 17 and an impedance 18 are connected in series across the starting switch 16. The impedance may be either a capacitor, a resistor, or a combination of the two.

In Fig. 3 is shown the switch 17 as operated by the rock shaft 20 in the bookkeeper. The set of contacts constituting the switch 17 is associated with the set of contacts 137 disclosed in Fig. 16 of the Roggenstein Patent 2,364,758 and referred to on page 3 at line 10. The rock shaft 20 is the rock shaft 135 of this Roggenstein patent, and is part of the carriage return mechanism described on page 3 at line 58 of the first column, et seq., and shown in Figs. 1 and 16 thereof. As the return mechanism is well known in the art it will not be described in detail, it being sufficient to note that the carriage 21 travels on rails 22. The rear frame of the carriage 21 has attached to its lower side a rack 23 in mesh with a pinion 24 carried by a vertical shaft 25 on which a worm wheel 26 is loosely journaled at the lower end. This worm wheel is driven by a worm 27 on a shaft 28 which in turn is power driven by a belt at the right-hand side of the machine.

The worm wheel 26 carries the driving element of a clutch, the driven element of which is a sleeve 30 slidably splined on the shaft 25 and controlled by an arm 31 fast on the rock shaft 20 which at its left-hand end, as seen in Fig. 3, is controlled through an arm 32 by a mechanism not shown herein, but which is well known in the art. This mechanism may be so set that, at the end of a line of writing, the arm 31 is automatically moved upward by a spring, throwing the clutch members into engagement, and at the end of the return motion of the carriage, is automatically pulled down and latched down by means controlled by the carriage. This part of the mechanism is shown in a patent to Hart, 1,978,997, and is not further described because it bears on the present invention only in the respect that it closes the pair of contacts 17 to make an electric circuit at the time the carriage is to be returned. These contacts are mounted, respectively, on the two blades 33 and 34 fastened to the rear left-hand corner post of the typewriter, and bear against the cross stud 35 that is swung toward the front of the machine whenever the tabulator is in operation. The shaft 20 has fast thereon a depending arm 36, which also moves this same cross stud 35 forward during the time when the carriage return mechanism is in operation. In its normal position this stud 35 permits the contacts 17 to open, but whenever this stud 35 is moved toward the front of the machine either by the tabulator or by the carriage return mechanism it forces the leaf 34 against the leaf 33 to close the contacts 17, with the result that the starting winding is energized to increase the power of the motor for the return of the heavy carriage.

The purpose of the reactance in series with the auxiliary switch and the starter winding is to split the phase of the two windings and make a split phase motor out of the basic induction motor.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a business machine having a movable carriage, a carriage return mechanism comprising a rack fixed to the carriage, a gear in mesh with the rack, a drive shaft fixed to the gear, a clutch member rotatably mounted on the shaft, a motor having a main winding and a starting winding for driving the clutch member, a driven member for the clutch splined to the shaft and normally disengaged from the first clutch member, a carriage return rock shaft, an arm fixed to the rock shaft for moving the driven member of the clutch into engagement with the first mentioned clutch member on the rocking of the rock shaft, a pair of contacts, a second arm on the rock shaft for closing the contacts on engagement of the clutch members and circuit means controlled by the contacts for energizing the starting winding to increase the torque of the motor.

2. In a business machine having a movable carriage, a carriage return mechanism comprising a rack fixed to the carriage, a gear in mesh with the rack, a drive shaft fixed to the gear, a clutch member rotatably mounted on the shaft, a motor having a main winding and a starting winding for driving the clutch member, a driven member for the clutch splined to the shaft and normally disengaged from the first clutch member, a carriage return rock shaft, an arm fixed to the rock shaft for moving the driven member of the clutch into engagement with the first mentioned clutch member on the rocking of the rock shaft, a pair of contacts, a second arm on the rock shaft, means operated by the second arm for closing the contacts on engagement of the clutch members, a source of alternating current and circuit means including an impedance operable by the contacts when closed for connecting the starting winding to the alternating current source to increase the torque of the motor.

3. In a business machine having a movable carriage, a carriage return mechanism comprising a rack fixed to the carriage, a gear in mesh with the rack, a drive shaft fixed to the gear, a clutch member rotatably mounted on the shaft, a source of alternating current, a motor for driving the clutch member energized from the current source and having a main winding and a starting winding, the starting winding being normally disconnected from the source while the motor is operating, a driven member for the clutch splined to the shaft and normally disengaged from the first clutch member, a carriage return rock shaft, an arm fixed to the rock shaft for moving the driven member of the clutch into engagement with the first mentioned clutch member on the rocking of the shaft, a pair of contacts, a capacitor connected thereto, a second arm on the rock shaft for closing the contacts as the clutch members move into engagement, and circuit means completed by the closing of the contacts for connecting the starting winding in series with the capacitor to the source of alternating current to provide an increased torque for the motor.

EDWIN O. ROGGENSTEIN.

References Cited in the file of this patent

UNITED STATES PATENTS

| Number | Name | Date |
|---|---|---|
| 2,393,958 | Blankenship et al. | Feb. 5, 1946 |